US009215659B2

(12) United States Patent
Asrani et al.

(10) Patent No.: US 9,215,659 B2
(45) Date of Patent: Dec. 15, 2015

(54) METHOD AND APPARATUS FOR DISCONNECTING A WIRELESS COMMUNICATION LINK BETWEEN A COMMUNICATION DEVICE AND A MOBILE DEVICE

(71) Applicant: Google Technology Holdings LLC, Mountain View, CA (US)

(72) Inventors: Vijay L Asrani, Round Lake, IL (US); Paul L Fordham, Wauconda, IL (US); Hardik D Shah, Fremont, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 112 days.

(21) Appl. No.: 13/945,968

(22) Filed: Jul. 19, 2013

(65) Prior Publication Data
US 2015/0024786 A1   Jan. 22, 2015

(51) Int. Cl.
*H04W 52/02* (2009.01)
*H04W 4/00* (2009.01)
*H04W 4/02* (2009.01)
*H04W 88/06* (2009.01)
*H04W 64/00* (2009.01)
*H04W 76/06* (2009.01)
*H04W 88/04* (2009.01)

(52) U.S. Cl.
CPC .......... *H04W 52/0229* (2013.01); *H04W 4/008* (2013.01); *H04W 4/023* (2013.01); *H04W 64/003* (2013.01); *H04W 76/06* (2013.01); *H04W 88/06* (2013.01); *H04W 76/068* (2013.01); *H04W 88/04* (2013.01)

(58) Field of Classification Search
CPC ... H04L 12/58; H04L 67/306; H04L 52/0254; H04W 4/206; H04W 8/18; H04W 88/04; H04W 4/026; H04W 76/02; H04W 76/068; G06Q 30/0207; G06Q 30/0269
USPC ............. 455/426.1, 681, 41.2, 41.1, 345, 455/539.23; 705/14.64, 14.58, 14.62
See application file for complete search history.

(56) References Cited

U.S. PATENT DOCUMENTS

| 2006/0099940 | A1 | 5/2006 | Pfleging et al. |
| 2007/0042714 | A1 | 2/2007 | Ayed |
| 2012/0161927 | A1 | 6/2012 | Pierfelice et al. |
| 2012/0309388 | A1 | 12/2012 | Moosavi et al. |
| 2012/0316967 | A1* | 12/2012 | Mgrdechian et al. ...... 705/14.64 |
| 2013/0078980 | A1 | 3/2013 | Saito |
| 2013/0316687 | A1 | 11/2013 | Subbaramoo et al. |

FOREIGN PATENT DOCUMENTS

WO   WO 2012/115649 A1   8/2012

OTHER PUBLICATIONS

European Patent Office, International Search Report and the Written Opinion in International Patent Application No. PCT/US2014/047233 Jan. 22, 2015.

* cited by examiner

*Primary Examiner* — Nizar Sivji
(74) *Attorney, Agent, or Firm* — Wolfe-SBMC

(57) ABSTRACT

A method and apparatus of determining whether to disconnect a wireless communication link between a communication device disposed in a vehicle and a mobile device is provided. The method comprises determining whether the communication device is moving or not moving, determining whether the mobile device has exited the proximity of the vehicle, and disconnecting the wireless communication link when the communication device is not moving and the mobile device has exited the proximity of the vehicle.

15 Claims, 4 Drawing Sheets

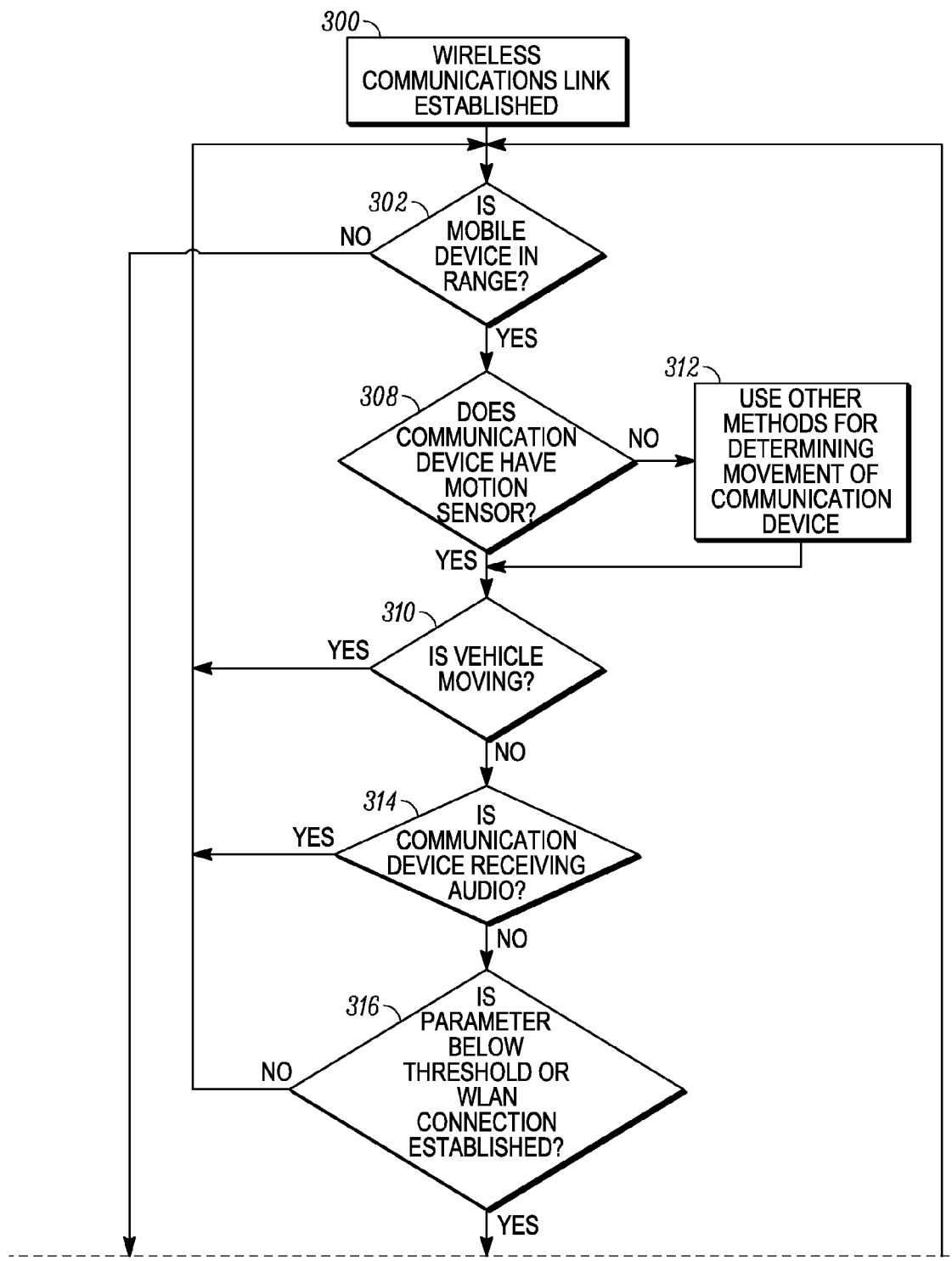
FIG. 3  FIG. 3A / FIG. 3B    FIG. 3A

METHOD AND APPARATUS FOR DISCONNECTING A WIRELESS COMMUNICATION LINK BETWEEN A COMMUNICATION DEVICE AND A MOBILE DEVICE

TECHNICAL FIELD

The present disclosure relates in general to wireless communications between an audio/visual communication device in a vehicle and a mobile device, and, in particular, to designs for disconnecting a wireless communications link between the devices when the mobile device has exited the proximity of the vehicle, but remains within range of the communication device.

BACKGROUND

Mobile devices such as cellular telephones are regularly used in vehicles. Devices exist which permit the hands-free use of such mobile devices by users operating the vehicles. Hands-free operation of mobile devices is desirable to prevent the dangers associated with operating a mobile device (i.e., holding the mobile device with one hand and/or dialing numbers on the mobile device) while operating a vehicle. Such devices may be built in to the vehicle or carried within the vehicle, such as by being attached to a visor or other structure of the vehicle. In either case, the devices communicate with the mobile device over a short range wireless communications link which enables the communication device to receive audio and/or video input from the user of the mobile device and to output audio and/or video to the user from the party communicating with the mobile device. Communication devices that are not built in to the vehicle are not powered down automatically when the vehicle is shut down. Such devices are powered by a power source, such as a rechargeable battery, that typically continues to provide power to the communication device, even if the vehicle power is shut off. Accordingly, a stand-alone communication device preferably determines when communication with a mobile device is no longer necessary (i.e., when the vehicle is stopped and the user of the mobile device has left the vehicle), disconnects the wireless communication link when communications are no longer necessary, and places the communication device in a low power consumption mode of operation after disconnection.

Known communication devices disconnect the wireless communications link with mobile devices when the mobile device is no longer within range of the communication device. In other words, when the communication device can no longer communicate with the mobile device over the wireless communications link, known communication devices disconnect the wireless communications link and place the communication device into a stand-by or power savings mode to prevent unnecessary power consumption of the communication device when the user fails to manually place the communication device into such a low power mode of operation. Other known communication devices, such as the device disclosed in U.S. Published Application No. 2012/0309388, require that both the communication device and the mobile device include a motion sensor, and disconnect the wireless communication link between the devices when one device is moving while the other device is stationary.

It is not uncommon for the user of the communication device to fail to manually place the communication device into a low power mode of operation and to exit the proximity of the vehicle with the mobile device while remaining within the range of the communication device. For example, many users exit the proximity of the vehicle yet remain within the range of the wireless communications link of the communication device without manually placing the communication device into a low power consumption mode when the user exits the vehicle with the mobile device to enter the user's home. Often, the user parks the vehicle containing the communication device near the user's home, such as in an attached garage, enters the user's home with the mobile device and remains within the range of the wireless communications link of the communication device while in the home. In such circumstances, the user's mobile device remains in communication with the communication device in the vehicle, causing the communication device to unnecessarily consume power and divert calls and other audio and/or video to the communication device when the user is in the home, not in the vehicle where the communication device is located.

Accordingly, it is desirable to provide a communication device and/or a system including a communication device that disconnects the wireless communications link between the communication device and the mobile device when it is determined that the communication device (and therefore the vehicle) is no longer moving, and the mobile device has exited the proximity of the vehicle, even though the mobile device remains within range of the communications link with the communication device.

BRIEF DESCRIPTION OF THE DRAWINGS

The embodiments will be more readily understood in view of the following description when accompanied by the below figures and wherein like reference numerals represent like elements, wherein:

FIGS. 3A and 3B are a flowchart of a method for disconnecting a wireless communications link between a communication device and a mobile device according to the teachings of the present disclosure.

DETAILED DESCRIPTION OF EXEMPLARY EMBODIMENTS

Figure 1:
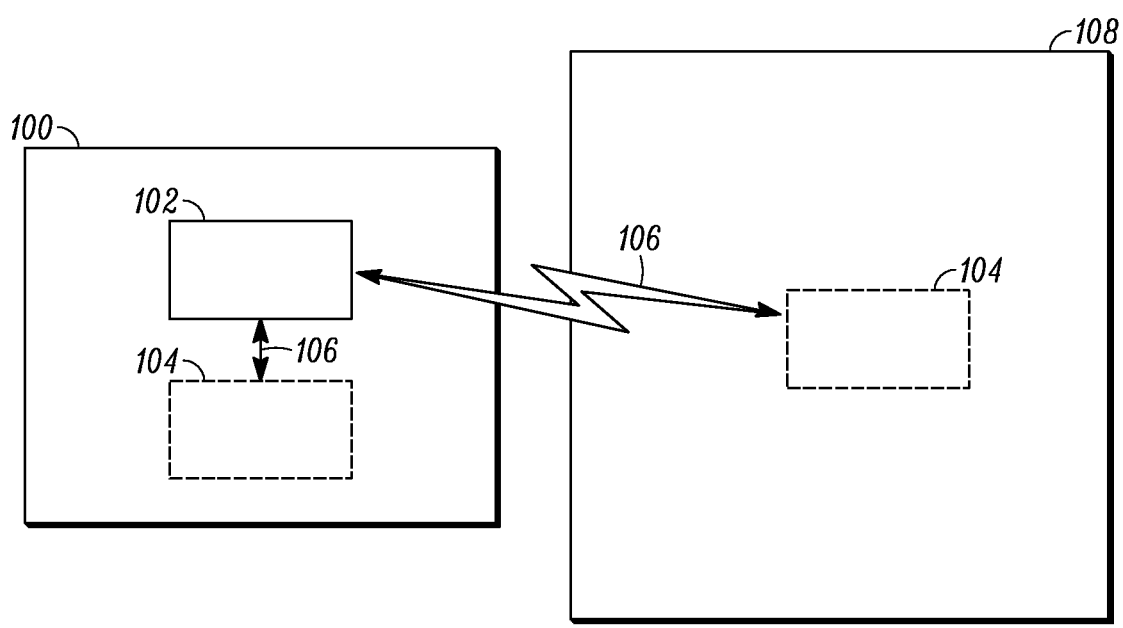
FIG. 1 is a conceptual view of a vehicle containing a communication device parked adjacent an exterior location into which the user takes the mobile device.

Briefly, in a specific embodiment, the wireless communications link between a communication device and a mobile device is disconnected when it is determined that the vehicle containing the communication device has stopped moving and the mobile device has exited the proximity of the vehicle. In general, one of the communication device and the mobile device determines that the communication device (and therefore the vehicle) has stopped moving and the mobile device has exited the proximity of the vehicle, and then disconnects the wireless communications link between the devices and places the communication device into a low power consumption mode of operation.

In one embodiment of the present disclosure, a method of determining whether to disconnect a wireless communication link between a communication device disposed in a vehicle and a mobile device is provided. The method comprises determining whether the communication device is moving or not moving, determining whether the mobile device has exited the proximity of the vehicle, and disconnecting the wireless communication link when the communication device is not moving and the mobile device has exited the proximity of the vehicle. In one aspect of this embodiment, disconnecting the wireless communication link further comprises waiting a predetermined time period after determining that the communication device is not moving and the mobile device has exited the proximity of the vehicle. In a variant of this aspect, disconnecting the wireless communication link further comprises monitoring whether the communication device receives a signal from the mobile device during the predetermined time period and disconnecting the wireless communication link only if the communication device is not moving, the mobile device has exited the proximity of the vehicle, and the communication device does not receive a signal from the mobile device during the predetermined time period. In another aspect, disconnecting the wireless communication link further comprises determining whether the mobile device is connected to a wireless local area network and disconnecting the wireless communication link only if the communication device is not moving and the mobile device has either exited the proximity of the vehicle or connected to a wireless local area network. In a variant of this aspect, disconnecting the wireless communication link further comprises monitoring whether the communication device receives a signal from the mobile device during a predetermined time period after determining that the communication device is not moving and the mobile device has exited the proximity of the vehicle and disconnecting the wireless communication link only if the communication device is not moving, the mobile device has either exited the proximity of the vehicle or connected to a wireless local area network, and the communication device does not receive a signal from the mobile device during the predetermined time period. In yet another aspect of this embodiment, determining whether the communication device is moving or not moving comprises detecting a motion signal from a motion sensor associated with the communication device. In another aspect, determining whether the communication device is moving or not moving comprises determining whether the mobile device is moving based on a motion signal generated by the mobile device, and if the mobile device is moving and has not exited the proximity of the vehicle, assuming that the communication device is moving. In a variant of this aspect, the motion signal is one of an acceleration signal and a global positioning system signal. In yet another aspect of this embodiment, determining whether the mobile device has exited the proximity of the vehicle comprises comparing a parameter of a signal from the mobile device to a threshold, determining that the mobile device has not exited the proximity of the vehicle when the parameter is above the threshold and determining that the mobile device has exited the proximity of the vehicle when the parameter is below the threshold. In a variant of this aspect, the parameter is a received signal strength indicator of the signal from the mobile device. In another variant, determining whether the communication device is moving or not moving comprises comparing the parameter to the threshold, determining that the communication device is moving when the parameter is above the threshold, and determining that the mobile device is not moving when the parameter is below the threshold.

In another embodiment according to the present disclosure, a communication system configured for use in a vehicle is provided. The system comprises a mobile device comprising a motion sensor that generates movement signals indicative of motion of the mobile device, a cellular network transceiver configured to wirelessly transmit signals to and receive signals from a cellular network, a short range transceiver configured to wirelessly transmit short range signals to and receive short range signals from a communication device disposed in the vehicle over a wireless communications link, and a processor configured to evaluate the movement signals, and the communication device comprising a short range transceiver configured to wirelessly transmit short range signals to and receive short range signals from the mobile device over the wireless communications link, the short range signals from the mobile device having a parameter, and a processor that compares the parameter of the short range signals from the mobile device to a threshold to determine whether the mobile device is in the vehicle. In this embodiment, one of the mobile device and the communication device disconnects the wireless communications link based on a determination that the communication device is not moving and a determination that the mobile device has exited the proximity of the vehicle, the determination that the mobile device has exited the proximity of the vehicle being based on the comparison of the parameter of the short range signals from the mobile device to the threshold.

In another embodiment of the present disclosure, a communication device configured to provide hands-free telephone communications when operated with a mobile device in a vehicle is provided. The device comprises an input device for receiving an audio or video signal from a user in the vehicle, a short range transceiver for wirelessly transmitting short range signals corresponding to the signals received by the input device to the mobile device over a wireless communications link and wirelessly receiving short range signals from the mobile device having a parameter, an output device for outputting signals corresponding to the short range signals received from the mobile device, a memory for storing instructions, and a processor configured to execute the instructions stored in the memory to disconnect the wireless communications link in response to determining that the communication device is not moving and the mobile device has exited the proximity of the vehicle. In one aspect of this embodiment, the processor determines that the mobile device has exited the proximity of the vehicle by one of comparing the parameter of the short range signals from the mobile device to a threshold, receiving a short range signal from the mobile device indicating that the mobile device has exited the proximity of the vehicle, and receiving a short range signal from the mobile device indicating that the mobile device has connected to a wireless local area network. In another aspect, the processor disconnects the wireless communications link after a predetermined time period has elapsed since the determination that the communication device is not moving and the mobile device has exited the proximity of the vehicle. In a variant of this aspect, the processor disconnects the wireless communications link after the predetermined time period has elapsed without the short range transceiver (200) receiving a short range signal from the mobile device that includes an audio and/or video signal. In another aspect, the processor determines that the communication device is not moving by one of receiving a short range signal from the mobile device indicating that the mobile device has exited the proximity of the vehicle, receiving a short range signal from the mobile device indicating that the mobile device has connected to a wireless local area network, and comparing the parameter of the short range signals from the mobile device to the threshold. In still another aspect, the device further comprises a motion sensor, and the processor determines that the communication device is not moving by evaluating movement signals from the motion sensor. In still another aspect, the processor determines that the communication device is not moving when a signal received by the input device corresponds to a sound of a door of the vehicle closing. In yet another aspect, the parameter is a received signal strength indicator of the short range signals from the mobile device.

Turning now to the drawings, FIG. 1 depicts a vehicle 100 including a communication device 102 in communication with a mobile device 104 over a wireless communication link 106. In normal operation, communication device 102 permits the user of mobile device 104 to conduct hands-free communications (audio or video or both) with users of other mobile devices in communication with mobile device 104 over a cellular communications network (not shown). As such, while the user (and mobile device 104) remains within vehicle 100 (which contains communication device 102 attached to a sun visor or other structure of vehicle 100), the user can talk to and establish communications with users of other mobile devices using communication device 102 without holding or otherwise operating mobile device 104. As explained in detail below, mobile device 104 is in communication with communication device 102 over wireless communications link 106 to permit the user in vehicle 100 to communicate with other mobile device users by talking to the communication device and listening to the other users through an audio and/or visual output of the communication device 102. More specifically, communication device 102 receives signals (e.g., voice and/or video) from the user of mobile device 104 through an input device such as a microphone on communication device 102. Communication device 102 then conveys those signals to mobile device 104 over link 106 to permit mobile device 104 to communicate the signals to the other users over a cellular communications network. Additionally, communication device 102 receives signals from mobile device 104 over communications link 106 corresponding to signals received from the other users over the cellular network, and outputs those signals to the user of mobile device 104 using a speaker or other output device.

In FIG. 1, mobile device 104 is shown in dotted lines both within vehicle 100 in communication with communication device 102 via link 106 and outside vehicle 100, for example, within the user's home 108. When in user's home 108, mobile device 104 remains in communication with communication device 102 via link 106 because mobile device 104 has not been moved far enough away from communication device 102 to be out of range of communications link 106. This example represents a situation where the user of mobile device 104 parks vehicle 100 near home 108 (such as in an attached garage), does not turn off communication device 102, and enters home 108 with mobile device 104, remaining within range of communications link 106. In such a situation, calls to mobile device 104 are diverted to communication device 102, music played on mobile device 104 is diverted to communication device 102, and communication device 102 unnecessarily consumes power.

Figure 2:
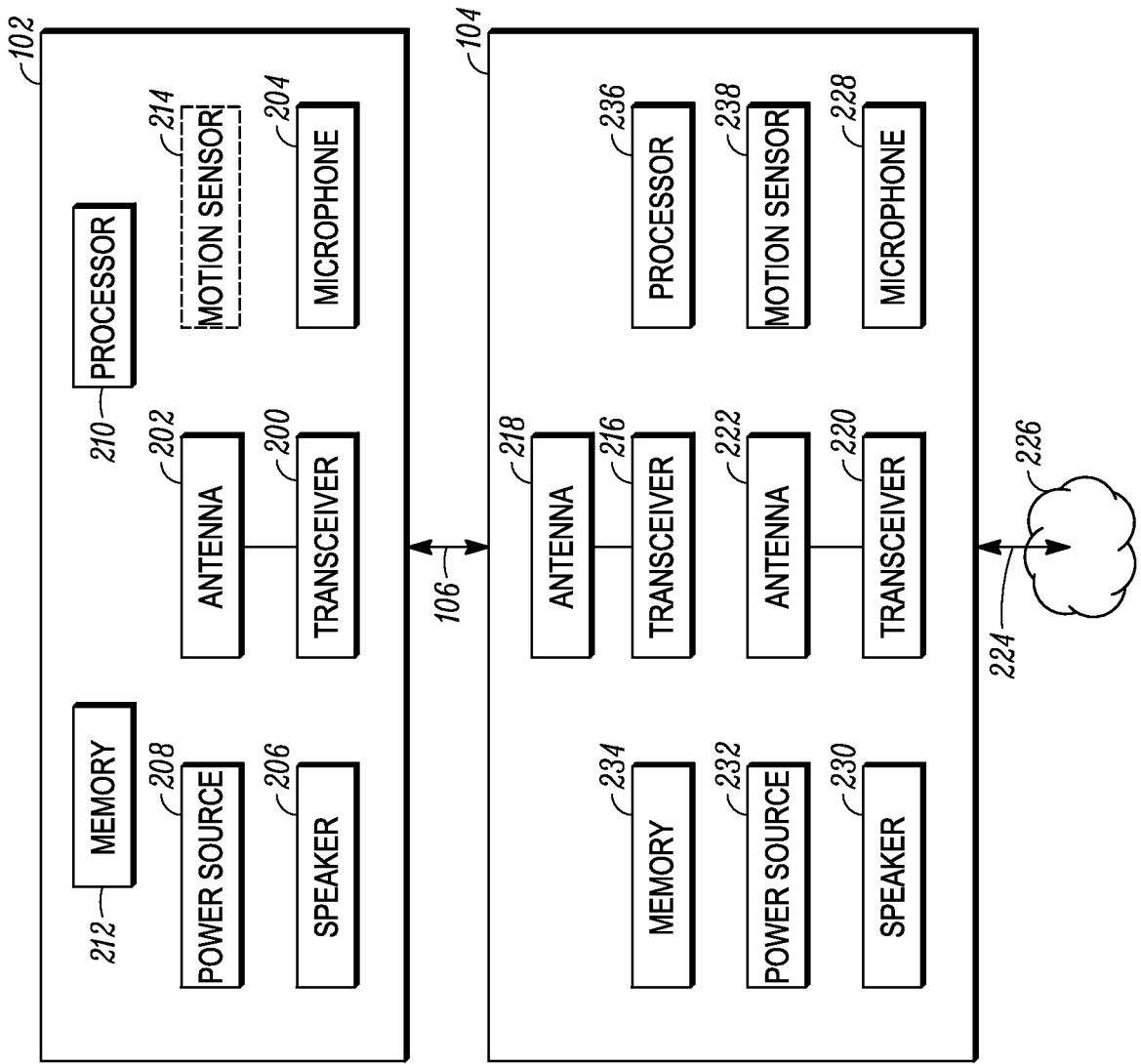
FIG. 2 is a block diagram of a communication device and a mobile device in communication with the communication device.

FIG. 2 provides a block diagram of communication device 102 and mobile device 104 in communication over wireless communications link 106. Communication device 102 generally includes a transceiver 200 that receives and transmits short range signals to and from mobile device 104 via antenna 202 over wireless communications link 106, an input device (hereinafter referred to as microphone 204) that receives signals (such as voice) from the user of mobile device 104, an output device (hereinafter referred to as speaker 206) that outputs signals to the user of mobile device 104, a power source 208 that provides electrical power to communication device 102, a processor 210 for controlling operations of communication device 102, a memory 212 that includes instructions for execution by processor 210 and an optional motion sensor 214 which is described in more detail below. Communication device 102 may further include user interface components (not shown) such as a display, keyboard, buttons, or other components for permitting the user to interface with communication device 102.

Transceiver 200 may be any acceptable transceiver device for use in providing short range wireless communications with other compatible devices such as mobile device 104. For example, transceiver 200 may comply with a short range communication protocol such as Bluetooth® or other acceptable low power, short range wireless communications standard. As such, transceiver 200 typically will facilitate communications with mobile device 104 over link 106 as long as mobile device 104 remains within approximately 100 meters of communication device 102 or other distance associated with the particular transceiver used.

Microphone 204 may be any suitable device that permits detection of signals (either audio or visual) from a nearby source such as a person sitting in vehicle 100. Speaker 206 similarly may be any suitable output device (either audio or visual or both) or multiple devices that provide an output that can be received by a person in vehicle 100. Power source 208 may be a rechargeable battery or set of batteries, a non-rechargeable battery or set of batteries, or even a connection to the battery of vehicle 100. Processor 210 may be any processing device or group of devices capable of executing instructions stored in memory 212 to carry out the functions described herein, such as any type of instruction-set processor (e.g., microcontroller) or microprocessor known in the art. As described herein, processor 210 may execute program(s) and/or instructions stored in memory 212. Although this description sets forth implementation of processor 210 as executing a software program or set of instructions, those skilled in the art will appreciate that the functions described herein may be implemented in hardware, software, or a combination of hardware and software. Such implementations may include a number of processors independently executing various programs and dedicated hardware, such as application specific integrated circuits (ASICs), field programmable gate arrays (FPGAs), and the like. Memory 212 may be one or more suitable memory devices that provide any type of tangible storage medium, including one or more of random access memory, read only memory, magneto-resistive read/write memory, optical read/write memory, cache memory, magnetic read/write memory, and the like.

In FIG. 2, communication device 102 is depicted as optionally including motion sensor 214. In some embodiments, communication device 102 does not include motion sensor 214 such as to provide a lower cost communication device 102. The concepts of the present disclosure vary depending upon whether motion sensor 214 is included in communication device 102 as further described below. If motion sensor 214 is included, any of a variety of motion sensors may be used that generate electric signals based on the position and/or movement (e.g., acceleration) of communication device 102. In one embodiment, motion sensor 214 is an accelerometer which provides processor 210 with electric signals indication whether communication device 102 (and therefore vehicle 100) is in motion. In other embodiments, motion sensor 214 may be Global Positioning System ("GPS") sensor.

Referring again to FIG. 2, mobile device 104 is any of a variety of known mobile devices that facilitate communications and other functions such as cellular telephones with smart phone features. In general, mobile device 104 includes a first transceiver 216 and associated antenna 218 for communicating with transceiver 200 of communication device 102 over communications link 106. As described above, a suitable transceiver 216 complies with a low power, short range communications protocol such as Bluetooth®. Mobile device 104 further includes a second transceiver 220 (and associated antenna 222) for facilitating communications with other mobile devices over a cellular link 224 to a cellular network 226 as is well known in the art. Mobile device 104 also includes a standard microphone 228, speaker 230, power source 232, memory 234 and processor 236. Power source 232 may be a rechargeable battery or set of batteries. Processor 236 may be any processing device or group of devices capable of executing instructions stored in memory 234 to carry out the functions described herein, such as any type of instruction-set processor (e.g., microcontroller) or microprocessor known in the art. As described herein, processor 236 may execute program(s) and/or instructions stored in memory 234. Although this description sets forth implementation of processor 236 as executing a software program or set of instructions, those skilled in the art will appreciate that the functions described herein may be implemented in hardware, software, or a combination of hardware and software. Such implementations may include a number of processors independently executing various programs and dedicated hardware, such as application specific integrated circuits (ASICs), field programmable gate arrays (FPGAs), and the like. Memory 234 may be one or more suitable memory devices that provide any type of tangible storage medium, including one or more of random access memory, read only memory, magneto-resistive read/write memory, optical read/write memory, cache memory, magnetic read/write memory, and the like.

Finally, mobile device 104 also includes one or more motion sensors 238, which provide signals to processor 236 indicating the position and/or movement of mobile device 104. Motion sensor 238 may include an accelerometer and/or a GPS sensor as are generally provided on smart phones. As is further described below, motion sensor 238 can permit communication device 102 and/or mobile device 104 to infer motion of communication device 102 (in embodiments of communication device 102 not including motion sensor 214), and determine motion characteristics of mobile device 104 (i.e., whether mobile device 214 is being carried by a person who is walking or is being moved within vehicle 100).

In operation, mobile device 104 and communication device 102 are powered on and paired or coupled to one another over wireless communications link 106 according to conventional techniques. When mobile device 104 receives or makes a call to another mobile device connected to mobile device 104 over network 226 and link 224 (via transceiver 220 and antenna 222), transceiver 216 and antenna 218 provide signals to antenna 202 and transceiver 200 of communication device 102 over link 106 representing the signals received from the other mobile device. In other words, signals received from the other mobile device are provided to communication device 102 over link 106. Communication device 102 then outputs the signals over speaker 206 so the user of mobile device 104 can hear (and/or view information from) the caller without having to hold mobile device 104. When the user of mobile device 104 responds to the caller, microphone 204 detects the signals of the user and processor 210 processes the signals for transmission via transceiver 200 and antenna 202 over link 106 to antenna 218 and transceiver 216 of mobile device 104. Mobile device 104 then transmits the signals via transceiver 220 and antenna 222 over link 224 and network 226 for receipt by the other mobile device. In this manner, the user of mobile device 104 can speak to the caller through communication device 102 without having to hold mobile device 104.

It should be noted that communication device 102 may also be used to play music provided by mobile device 104. In this mode of operation, the signals provided by mobile device 104 represent music received by or stored on mobile device 104. The signals are provided to communication device 102 over link 106 and output through speaker 206. In either mode of operation, communication link 106 is normally maintained as long as both communication device 102 and mobile device 104 are on and not separated by a distance greater than the range of wireless communication link 106. According to the principles of the present disclosure, however, communication link 106 is disconnected under circumstances indicating that the user has unintentionally left communication device 102 on and exited the proximity of the vehicle with mobile device 104, even though mobile device 104 remains within range of communication device 102.

Figure 3B:
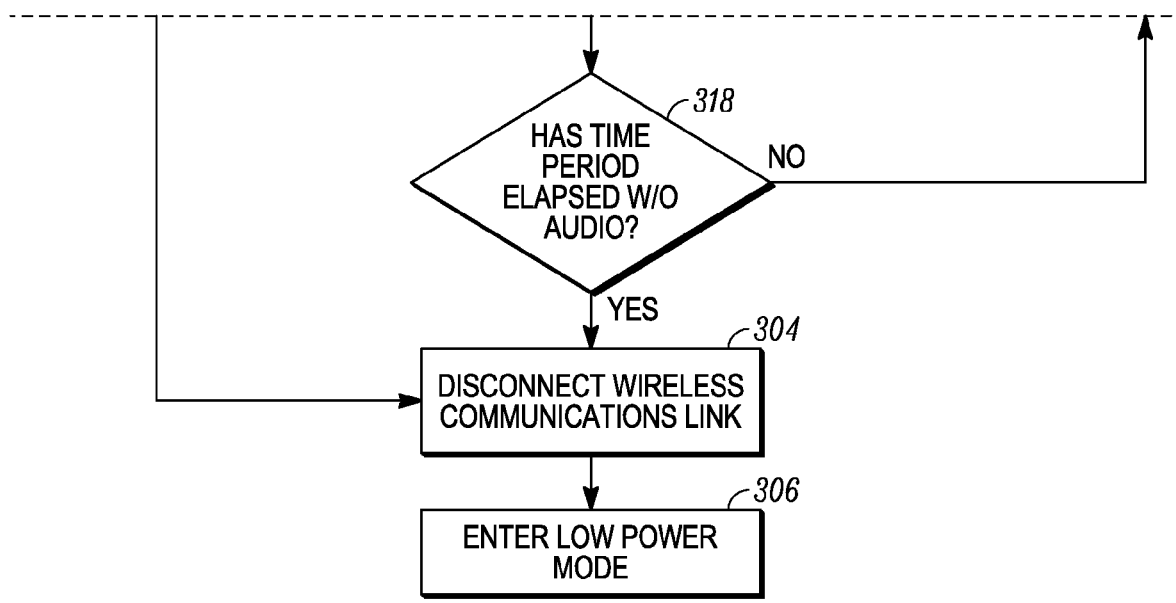

Referring now to FIGS. 3A and 3B, a method according to the present disclosure is depicted in the form of a flowchart. At step 300, wireless communications link 106 is established between communication device 102 and mobile device 104 in the manner described above. At step 302, one of communication device 102 and mobile device 104 determine whether mobile device 104 is within range of communication device 102. In this step, either communication device 102 or mobile device 104 determine whether a communication signal can be successfully sent or received over link 106. If not, then wireless communications link 106 is disconnected at step 304 and at step 306 communication device 102 is placed into a low power consumption mode of operation such as a stand-by mode. On the other hand, if mobile device 104 is within range of communication device 102 as determined at step 302, then it is determined at step 308 whether communication device 102 includes optional motion sensor 214 (FIG. 2). It should be understood that step 308 may be omitted in embodiments of the present disclosure where the instructions for carrying out the method assume that communication device 102 either has or does not have motion sensor 214. In embodiments where motion sensor 214 is present on communication device 102, motion sensor 214 is used at step 310 to determine whether communication device 102 is moving. More specifically, motion sensor 214 such as an accelerometer provides electric signals to processor 210 of communication device 102, which interprets the signals according to principles that are known in the art to determine whether communication device 102 is in motion. If it is determined that communication device 102 is moving, then it can be assumed that vehicle 100 is moving, and wireless communications link 106 should be maintained. As such, the present method returns to step 302 and continuously loops until it is determined that either mobile device 104 is no longer in range (step 302) or vehicle 100 is no longer moving (step 310).

In embodiments where communication device 102 does not include motion sensor 214, the outcome of step 308 is to employ other methods of determining whether communication device 102 (and therefore vehicle 100) is moving as indicated by step 312. Various other methods may be employed. For example, the movement signals generated by motion sensor 238 of mobile device 104 may be used to infer movement of vehicle 100. In such an embodiment, for example, if motion sensor 238 provides a rhythmic accelerometer signal characteristic of mobile device 104 being carried in the pocket of a person walking, then it may be assumed that communication device 102 and vehicle 100 have stopped moving. Alternatively, if mobile device 104 includes a GPS sensor as motion sensor 238, then a relatively stationary GPS signal may be interpreted as indicating that communication device 102 and vehicle 100 are stationary. In another embodiment, no motion sensor is used to determine whether vehicle 100 is not moving. Instead, processor 210 of communication device 102 evaluates sounds received through microphone 204. More specifically, processor 210 may execute instructions to identify sounds characteristic of the closing of a door of vehicle 100 or the closing of a door followed shortly after by sounds characteristic of the engine of vehicle 100 being shut down, each of which could indicate that vehicle 100 is no longer moving. In a related embodiment, processor 210 may identify sounds received through microphone 204 indicating ambient sounds of vehicle 100 operation (e.g., vibrations, engine noise, wind noise, etc.). When such ambient sounds are no longer present, processor 210 may assume that vehicle 100 is no longer moving. In still another embodiment as further described below, a parameter of signals exchanged between communication device 102 and mobile device 104 is compared to a threshold to determine whether mobile device 104 has exited the proximity of vehicle 100, which indicates that vehicle 100 has stopped moving.

If it is determined at step 310 using any of the above-described techniques that vehicle 100 is not moving, then the method of the present disclosure determines at step 314 whether communication device 102 is receiving signals from mobile device 104. If so, then even though vehicle 100 has stopped moving, the user must still be communicating (such as when the user sits in a parked car and continues a conversation) using mobile device 104, and the method returns to step 302. If no signal is being received by communication device 102, then at step 316 it is determined whether the signals from mobile device 104 indicate that the user of mobile device 104 has exited the proximity of vehicle 100 or has connected to a wireless local area network ("WLAN"). More specifically, as communication device 102 and mobile device 104 communicate over link 106, the signals received by communication device include a parameter indicating the strength of the connection between the two devices. In some embodiments, the parameter is a received signal strength indicator ("RSSI"). While mobile device 104 is in vehicle 100 in very close proximity to communication device 102, the parameter will indicate a very strong signal from mobile device 104. When the user exits vehicle 100 with mobile device 104, an abrupt change in the parameter may be detected by communication device 102 resulting from the sudden change in distance between the devices. Processor 210 of communication device 102 may periodically compare the parameter to a threshold value, and if the parameter falls below the threshold, processor 210 may determine that mobile device 104 has been moved to a distance from communication device 102 indicating that mobile device 104 is no longer in vehicle 100. If the parameter remains above the threshold, then processor 210 may determine that mobile device 104 is still in vehicle 100. In this manner, communication device 102 or mobile device 104 may infer from the parameter of the signals exchanged between the devices that the user has exited the proximity of vehicle 100 with mobile device 104. In another embodiment, communication device 102 determines both that communication device 102 is not moving (step 310) and that mobile device 104 has exited the proximity of vehicle 100 based on the comparison of the parameter of the short range signals from mobile device 104 to the threshold. In this embodiment, it is assumed that if mobile device 104 has left very close proximity to communication device 102, then mobile device 104 must have exited the proximity of vehicle 100, which implies that vehicle 100 (and communication device 102) must have stopped moving.

In an alternative embodiment, when the user enters his or her home, for example, mobile device 104 may automatically connect to a WLAN within the home. If this occurs, it may be assumed by mobile device 104 or communication device 102 (upon receiving a signal from mobile device 104 indicating that such a WLAN connection has been established) that the user (and mobile device 104) has exited the proximity of vehicle 100.

If the parameter of the signals exchanged between communication device 102 and mobile device 104 does not indicate that mobile device 104 has exited the proximity of vehicle 100 and no WLAN connection is established, then the method of the present disclosure returns to step 302. If, on the other hand, the parameter indicates that mobile device 104 has exited the proximity of vehicle 100 or a WLAN connection has been established, then the method of the present disclosure assumes that mobile device 104 has exited the proximity of vehicle 100, even though mobile device 104 remains within communications range of communication device 102. At step 318, it is determined whether a predetermined period of time (e.g., one minute) has passed since the determination that mobile device 104 has exited the proximity of vehicle 100 without communication device 102 receiving signals from mobile device 104. If not (i.e., mobile device 104 provides a signal to communication device 102 within the predetermined time period when, for example, another call is received by mobile device 104), then the method returns to step 302. In this manner, communications link 106 is maintained between communication device 102 and mobile device 104 even though it is determined that vehicle 100 has stopped moving and mobile device 104 has exited the proximity of vehicle 100. This permits a continuation of communications link 106 in situations, for example, when the user of mobile device 104 takes mobile device 104 out of vehicle 100 but intends to maintain communications link 106 (e.g., when the user exits the vehicle to pump gas). While a predetermined time period of one minute is described in an exemplary embodiment, it should be understood that the time period may be shorter or longer and still be in accordance with the principles of the present disclosure.

If the predetermined time period passes without communication device 102 receiving signals from mobile device 104, then wireless communications link 106 is disconnected (by either communication device 102 or mobile device 104) at step 304. Then, communication device 102 is placed in a low power mode of operation at step 306. The method resumes at block 300 when communication device 102 and mobile device 104 are again paired with one another, thereby re-establishing wireless communications link 106.

The foregoing description has been presented for the purposes of illustration and description. It is not intended to be exhaustive or to limit the disclosure to the exemplary embodiments disclosed. Many modifications and variations are possible in light of the above teachings. It is intended that the scope of the invention be limited not by this detailed description of examples, but rather by the claims appended hereto.

What is claimed is:

1. A method of determining whether to disconnect a wireless communication link between a communication device disposed in a vehicle and a mobile device, comprising:

determining, by a processor, whether the communication device is moving or not moving;

determining, by the processor, whether the mobile device has exited a proximity of the vehicle;

determining, by the processor, whether the mobile device is connected to a wireless local area network;

monitoring, by the processor, whether the communication device receives a signal from the mobile device during at least a predetermined time period after determining that the mobile device has exited the proximity of the vehicle or connected to a wireless local area network; and disconnecting the wireless communication link only if the communication device is not moving and the mobile device has either exited the proximity of the vehicle or connected to a wireless local area network, and the communication device does not receive a signal from the mobile device during the predetermined time period.

2. The method of claim 1, wherein determining whether the communication device is moving or not moving comprises detecting a motion signal from a motion sensor associated with the communication device.

3. The method of claim 1, wherein determining whether the communication device is moving or not moving comprises determining whether the mobile device is moving based on a motion signal generated by the mobile device, and if the mobile device is moving and has not exited the proximity of the vehicle, assuming that the communication device is moving.

4. The method of claim 3, wherein the motion signal is one of an acceleration signal and a global positioning system signal.

5. The method of claim 1, wherein determining whether the mobile device has exited the proximity of the vehicle comprises comparing a parameter of a signal from the mobile device to a threshold, determining that the mobile device has not exited the proximity of the vehicle when the parameter is above the threshold and determining that the mobile device has exited the proximity of the vehicle when the parameter is below the threshold.

6. The method of claim 5, wherein the parameter is a received signal strength indicator of the signal from the mobile device.

7. The method of claim 5, wherein determining whether the communication device is moving or not moving comprises comparing the parameter to the threshold, determining that the communication device is moving when the parameter is above the threshold, and determining that the communication device is not moving when the parameter is below the threshold.

8. The method of claim 1, wherein the predetermined time period is greater than about 1 minute.

9. A communication device configured for use in a vehicle, the communication device to communicate with a mobile device comprising a motion sensor that generates movement signals indicative of motion of the mobile device, a cellular network transceiver configured to wirelessly transmit signals to and receive signals from a cellular network, a short range transceiver configured to wirelessly transmit short range signals to and receive short range signals from a communication device disposed in the vehicle over a wireless communications link, and a processor configured to evaluate the movement signals;

the communication device comprising:
a short range transceiver configured to wirelessly transmit short range signals to and receive short range signals from the mobile device over the wireless communications link, the short range signals from the mobile device having a parameter, and
a processor that compares the parameter of the short range signals from the mobile device to a threshold to determine whether the mobile device is in the vehicle,
wherein the communication device disconnects the wireless communications link based on a determination that the communication device is not moving, the mobile device has either exited a proximity of the vehicle or connected to a wireless local area network, and the communication device does not receive a signal from the mobile device during a predetermined time period after determining that the communication device is not moving and the mobile device has either exited the proximity of the vehicle or connected to a wireless local area network, the determination that the mobile device has exited the proximity of the vehicle being based on the comparison of the parameter of the short range signals from the mobile device to the threshold.

10. The communication device of claim 9, wherein the predetermined time period is greater than about 1 minute.

11. A communication device configured to provide hands-free telephone communications when operated with a mobile device in a vehicle, comprising:
an input device for receiving an audio or video signal from a user in the vehicle;
a short range transceiver for wirelessly transmitting short range signals corresponding to the signals received by the input device to the mobile device over a wireless communications link and wirelessly receiving short range signals from the mobile device having a parameter;
an output device for outputting signals corresponding to the short range signals received from the mobile device;
a memory for storing instructions; and
a processor configured to execute the instructions stored in the memory to disconnect the wireless communications link in response to determining that the communication device is not moving and the mobile device has exited a proximity of the vehicle,
wherein the processor determines that the mobile device has exited the proximity of the vehicle by at least one of comparing the parameter of the short range signals from the mobile device to a threshold, receiving a short range signal from the mobile device indicating that the mobile device has exited the proximity of the vehicle, and receiving a short range signal from the mobile device indicating that the mobile device has connected to a wireless local area network, and
wherein the processor determines that the communication device is not moving by at least one of receiving a signal from the input device that corresponds to a sound of a door of the vehicle closing, receiving the short range signal from the mobile device indicating that the mobile device has exited the proximity of the vehicle, receiving the short range signal from the mobile device indicating that the mobile device has connected to a wireless local area network, and comparing the parameter of the short range signals from the mobile device to the threshold.

12. The device of claim 11, wherein the processor disconnects the wireless communications link after a predetermined time period has elapsed since the determination that the communication device is not moving and the mobile device has exited the proximity of the vehicle.

13. The device of claim 12, wherein the processor disconnects the wireless communications link after the predetermined time period has elapsed without the short range transceiver receiving a short range signal from the mobile device that includes an audio and/or video signal.

14. The device of claim 11, further comprising a motion sensor, the processor determining that the communication device is not moving by evaluating movement signals from the motion sensor.

15. The device of claim 11, wherein the parameter is a received signal strength indicator of the short range signals from the mobile device.

* * * * *